(No Model.)
J. BOWLES.
COMBINED SAW AND PLANER.
No. 505,154. Patented Sept. 19, 1893.
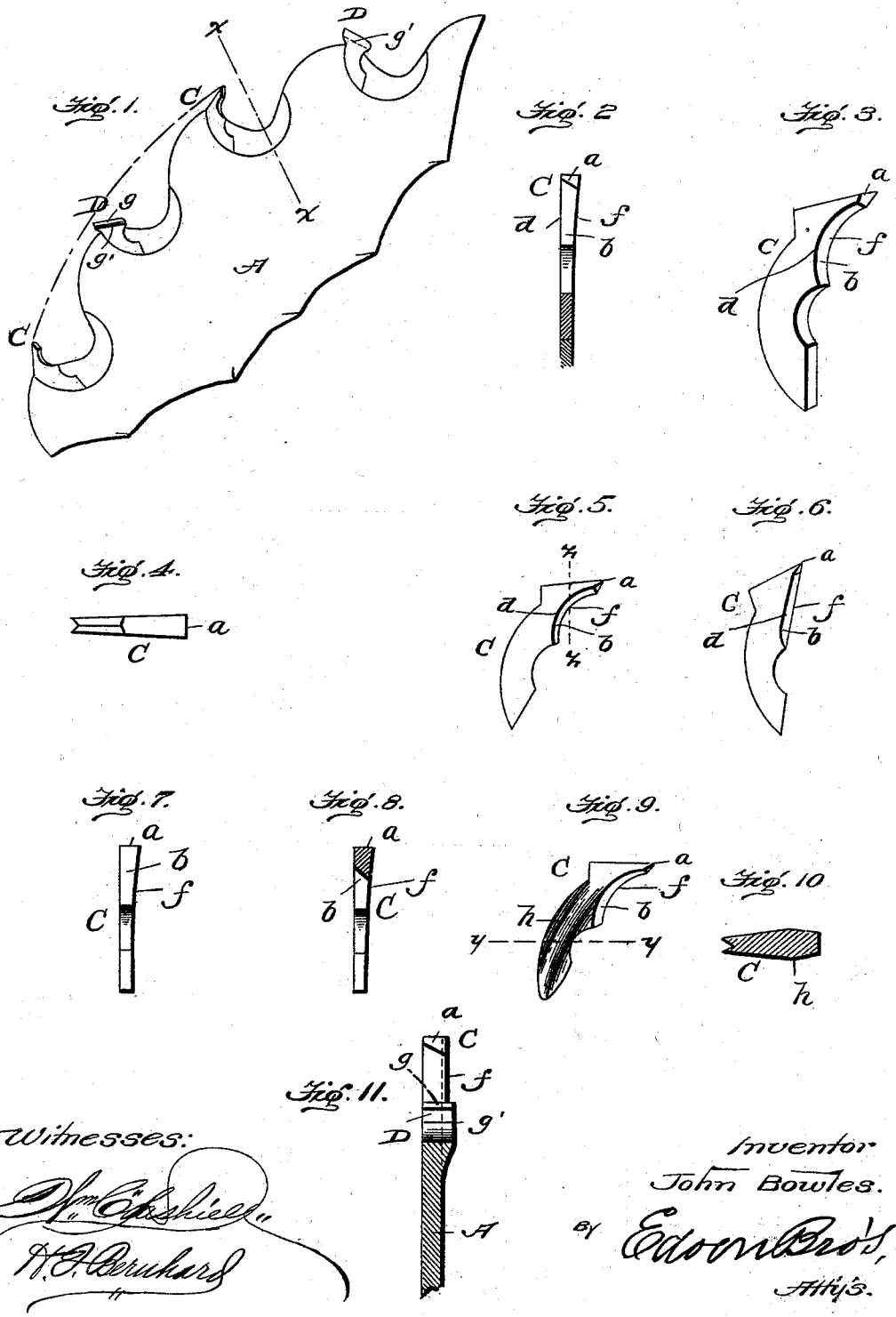
Witnesses:
Inventor
John Bowles.
By Edson Bros,
Attys.

UNITED STATES PATENT OFFICE.

JOHN BOWLES, OF WASHINGTON, DISTRICT OF COLUMBIA.

COMBINED SAW AND PLANER.

SPECIFICATION forming part of Letters Patent No. 505,154, dated September 19, 1893.

Original application filed April 12, 1892, Serial No. 428,879. Divided and this application filed November 19, 1892. Serial No. 452,578. (No model.)

*To all whom it may concern:*

Be it known that I, JOHN BOWLES, a citizen of the United States, residing at Washington, in the District of Columbia, have invented certain new and useful Improvements in a Combined Saw and Planer; and I do hereby declare the following to be a full, clear, and exact description of the invention, such as will enable others skilled in the art to which it appertains to make and use the same.

My present invention relates more particularly to insertible cutting and planing teeth for a combined saw and planer; and said improvement forms a division of an earlier application filed by me on the 12th day of April, 1892, Serial No. 428,879.

The object of my present improvement is to provide a saw with insertible teeth which are so constructed and organized that the surfaces of the log or wood are planed and smoothed while in the act of sawing the same into boards or pieces, and thus save the time, labor and expense required in rehandling and planing the wood after it has been sawed, besides preventing waste of wood in saw dust and shavings, which is very desirable when working hard expensive woods.

By this invention, I produce a saw and planer which is well adapted for all practical purposes to the sawing and planing of rough surfaces of logs, unseasoned timber, and resinous woods, to smooth or plane which resinous woods has heretofore been impracticable owing to the fact that the saw is liable to clog or choke up, as well as to working hard expensive woods in which it is desirable to avoid undue waste of the material.

With these ends in view, my invention consists of a combined saw and planer provided with a series of cutter teeth, and with another series of planer teeth which alternate with the cutter teeth, each cutter tooth having a square incision point at the apex thereof and provided on one side with a laterally extended shaving or paring edge, the sides of the tooth being converged from the front working face of the tooth to the rear neutral part thereof, to give the body of said cutter tooth the necessary clearance in the saw kerf while the shaving or paring edge at the front of the tooth operates to smooth and plane the wood on the sides of the kerf.

The invention further consists of a tooth having its front working face inclined or beveled from one side to the other so as to advance one side edge of the tooth and thereby form the planing or paring edge and provided with a right angled or square incision point above said beveled front face and at the apex of the tooth, one or both sides of the tooth being inclined inwardly from the front working face to the rear neutral face of the tooth.

The invention further consists in a saw tooth provided with a shaving or paring edge within the cutting point thereof and having the longitudinal central part of its body made thicker than at its front and rear edges so as to steady the running of the saw and planer in the kerf.

The invention consists finally in the peculiar construction and arrangement of parts as will be hereinafter fully described and pointed out in the claims.

In the accompanying drawings, forming a part of this specification—Figure 1 is a side elevation of a combined saw and planer having insertible teeth constructed in accordance with my invention. Fig. 2 is an enlarged detail sectional view on the plane indicated by the dotted line $x$—$x$ of Fig. 1, showing the cutter tooth in front elevation. Fig. 3 is an enlarged detail perspective view of the insertible cutter tooth. Fig. 4 is a plan view of the tooth shown by Fig. 3. Figs. 5 and 6 are detail perspective views of different shapes of the insertible cutter tooth. Fig. 7 is a front elevation of the cutter tooth shown by Fig. 5. Fig. 8 is a sectional view on the line $z$—$z$ of Fig. 5. Fig. 9 is a side view of the preferred form of the cutter tooth with its longitudinal central part made thicker than the front and rear faces of the tooth, and Fig. 10 is a transverse sectional view through the tooth shown by Fig. 9, on the dotted line $y$—$y$ of said figure. Fig. 11 is an enlarged view in front elevation of a group of cutting and planing teeth, showing the relative positions of the lateral paring and shaving edges on the cutter and planer teeth respectively.

Like letters of reference denote like parts in all the figures of the drawings.

Referring more particularly to Fig. 1 of the drawings, A designates the body or plate of a saw of either the well known circular or reciprocating variety. C, C, are the insertible cutter teeth, and D, D, are the insertible planer teeth which are arranged between the cutter teeth C and alternate therewith.

The adjacent pairs of cutter and planer teeth constitute what I shall hereinafter designate as a "group" or pair of teeth, each group comprising one cutter tooth C and one planer tooth D; thus the first and second teeth C, D, constitute one group, and the third and fourth teeth C, D, form another group, and so on around the periphery or along the edge of a saw. The cutter teeth C project farther beyond the periphery or edge of the saw blade than the planer teeth D, or in other words, the outer extremity of each planer tooth D terminates within the path described or cut by the incision or tearing edge $a$ of the cutter tooth C, as indicated by dotted lines in Fig. 1 so as to prevent the outer extremity of the planer tooth D from coming in contact with the cross grain or fibers of the wood and thus prevent the planer teeth from becoming unduly heated when the saw is in operation.

Each cutter tooth C has a front working face $b$ within the incision or tearing edge $a$ at the apex of the tooth, and likewise each planer tooth D has a similar working face $g$; but in order to increase the efficiency of the planer tooth D, the angle or inclination of its working face $g$ is reversed to the inclination of the working face $b$ of the adjacent cutter tooth; for instance, let the dotted line $x-x$ represent a radius of the saw blade extending between one group of planer and cutter teeth and it will be seen that the face $g$ of the planer tooth D is inclined toward the left of the dotted line $x-x$, while the front face $b$ of the adjacent cutter tooth C is inclined toward the right of said line, and furthermore, the angle of the face $g$ of the planer tooth to the line $x-x$ is greater than the inclination of the cutter tooth face $b$ to said line.

Each insertible cutter tooth C, C, has its tearing or incision edge $a$, at the apex of the tooth, made square or at right angles to the longitudinal axis of the tooth and to the axis of the saw blade; and within this square or right angled incision edge, the front working face $b$ of said cutter tooth is beveled or inclined from one side or face of the tooth to the other side or face thereof, so as to throw or project one side edge in advance of the other, and thereby form a shaving or paring edge $f$ which projects laterally beyond the side or face of the tooth as well as in advance of the opposite side or face thereof.

The planer tooth of the group or pair to which it belongs has its front working face $g$ beveled in a similar manner to the cutter tooth of the group so as to form on the planer tooth a lateral shaving or paring edge $g'$, the inclination of the bevel on the planer tooth being in the same direction as the bevel of the fellow cutter-tooth; and said planing edges $f$, $g'$, of the group extending in the same direction to one side of the saw blade; and, the groups of teeth having the planing edges $f$, $g'$, extended in opposite directions beyond the saw blade; thus the first group C, D, have the planing edges $f$, $g'$, extending from the right of the blade; the second group C, D, have their planing edges $f$, $g'$, extending from the left of the saw blade, and so on. But I do not strictly confine myself to this arrangement of the planing edges on the cutter and planer tooth, as the adjacent teeth may have the planing edges project in opposite directions from the saw blade; thus the planing edge $g'$ on the first planer tooth D may project from the left of the saw; the second or cutter tooth C may have its planing edge $f$ extend from the left of the saw blade; the third or planer tooth D may have its planing edge $g'$ extend from the right of the saw, and so on. As is usual, the outer or top sides of the cutter teeth C are beveled or inclined rearwardly from the incision point $a$ toward the heel, to give the outer part of the tooth sufficient clearance in the wood. The cutter teeth C, C, are relied upon to do all the work in cutting across the grain of the wood and in severing the boards or slabs from the log, and I am thus enabled to extend the planer edges $g'$ of the planer teeth D farther beyond the faces or sides of the saw blade than the planing edges $f$ of the cutter teeth as shown by Fig. 11; and in operation, the planing edges $f$ of the cutter teeth C serve to partially plane or smooth the faces of the wood while the planer edges $g'$ of the planer teeth D act to give a smoother finish to the wood than can be secured by the shaving edges $f$ on the cutter teeth C alone, which is especially desirable in sawing and planing hard woods. Each of the insertible teeth C, D, is locked or secured to the saw plate in any desirable way, which locking means, however, forms no part of my present improvement.

In order to give the cutting teeth C the necessary clearance in the saw kerf, I bevel or incline the lateral or side faces of each cutter-tooth inwardly from the front working beveled face $b$ thereof toward the rear neutral face of said cutter tooth, so that the front working face of the tooth is wider than the rear neutral face thereof, as clearly indicated by Fig. 4. But I do not confine myself strictly to this transverse taper of the body of the cutter-tooth, as I can make the longitudinal central part of the tooth, within or below the beveled working face $b$ and the shaving or paring edge $f$ of the tooth, somewhat thicker than at the front and rear faces of said tooth, thus forming a rib $h$, as indicated by Figs. 9 and 10, so that the ribbed central part of each tooth of the series of cutter teeth is adapted to bear against the sides of the wood and operate to steady the saw when running at high speed in the kerf. The front face $b$ of the cutter tooth may be curved longitudinally as in Figs. 1, 3, 5, and 9 of the drawings, or said face b may be inclined in a straight line back from the point a as shown by Fig. 6.

The operation and advantages of my invention will be readily understood and appreciated by those skilled in the art from the foregoing description taken in connection with the drawings.

Having thus fully described my invention, what I claim as new, and desire to secure by Letters Patent, is—

1. In a combined saw and planer, the cutter tooth provided at its outer extremity with the incision edge a lying substantially at right angles to the faces of the tooth and having the lateral shaving or paring edge f within the square incision edge a, the side faces of the tooth converging from the front working face thereof toward the rear neutral face, substantially as and for the purpose described.

2. In a combined saw and planer, the cutter tooth having its front working face beveled from one side toward the other, forming the advanced planer edge f on one side of said tooth, and the square incision edge a at the outer extremity or apex of the tooth, beyond the beveled front face and paring edge f of said tooth, substantially as and for the purpose described.

3. In a combined saw and planer, the cutter tooth provided with the square incision edge a at the outer extremity and at right angles to the longitudinal axis of said tooth, the shaving edge f on one side of the tooth and within its incision edge, a, and the longitudinal ridge on one or both sides of the tooth within the incision and paring edges thereof, combined with the alternate planer teeth whose outer extremities lie within the path described by the incision edge of the cutter tooth, as and for the purpose described.

4. In a combined saw and planer, the series of cutter teeth each having the incision edge at its apex and the shaving or paring edge projecting laterally beyond the face of the saw, combined with the planer teeth arranged alternately with relation to the cutter teeth, and each planer tooth having its extremity within the path described by the incision edge of the cutter teeth, and with its lateral planing edge extending farther beyond the face of the saw than the paring edge of the adjacent cutter teeth, substantially as and for the purpose described.

5. In a combined saw and planer, the series of cutter teeth each having its working face beveled transversely from one side to the other and forming a lateral shaving or paring edge within the incision edge, combined with a series of alternate planer teeth each having its lateral planing edge extending farther beyond the faces of the saw than the paring or shaving edges of the adjacent cutter teeth, substantially as and for the purpose described.

In testimony whereof I affix my signature in presence of two witnesses.

JOHN BOWLES.

Witnesses:
HARRY ENGLISH,
R. H. EVANS.